US009533412B2

(12) United States Patent
Ishige

(10) Patent No.: US 9,533,412 B2
(45) Date of Patent: Jan. 3, 2017

(54) ROBOT, ROBOT SYSTEM, ROBOT CONTROL DEVICE AND ROBOT CONTROL METHOD

(71) Applicant: Seiko Epson Corporation, Tokyo (JP)

(72) Inventor: Taro Ishige, Matsumoto (JP)

(73) Assignee: Seiko Epson Corporation (JP)

( * ) Notice: Subject to any disclaimer, the term of this patent is extended or adjusted under 35 U.S.C. 154(b) by 50 days.

(21) Appl. No.: 14/593,284

(22) Filed: Jan. 9, 2015

(65) Prior Publication Data
US 2015/0197006 A1 Jul. 16, 2015

(30) Foreign Application Priority Data

Jan. 15, 2014 (JP) ................. 2014-004894

(51) Int. Cl.
G05B 15/00 (2006.01)
B25J 9/00 (2006.01)
B25J 9/16 (2006.01)
B25J 18/02 (2006.01)
B25J 19/02 (2006.01)

(52) U.S. Cl.
CPC ............ *B25J 9/0096* (2013.01); *B25J 9/0087* (2013.01); *B25J 9/1697* (2013.01); *B25J 18/02* (2013.01); *B25J 19/023* (2013.01); *G05B 2219/40307* (2013.01); *G05B 2219/40617* (2013.01); *Y10S 901/47* (2013.01)

(58) Field of Classification Search
CPC ....... B25J 9/0096; B25J 9/0087; B25J 9/1697; B25J 18/02; B25J 19/023
USPC ........................................................ 700/259
See application file for complete search history.

(56) References Cited

U.S. PATENT DOCUMENTS

| 2012/0263347 | A1* | 10/2012 | Ichimaru | G01B 11/2518 382/103 |
| 2012/0265071 | A1* | 10/2012 | Berke | A61B 1/00149 600/439 |
| 2013/0269173 | A1* | 10/2013 | Albertson | G01R 3/00 29/593 |
| 2014/0201112 | A1* | 7/2014 | Sawada | G06N 99/005 706/12 |
| 2014/0277713 | A1* | 9/2014 | Kouno | B25J 9/0084 700/248 |
| 2015/0119214 | A1* | 4/2015 | Sasaki | B25J 15/0019 483/1 |

(Continued)

FOREIGN PATENT DOCUMENTS

| JP | 2011-051056 A | 3/2011 |
| JP | 2012-005557 A | 1/2012 |

*Primary Examiner* — Ian Jen
(74) *Attorney, Agent, or Firm* — Harness, Dickey & Pierce, P.L.C.

(57) ABSTRACT

An operation portion elevates or lowers imaging units of a robot in response to the user's operation of the operation portion, and when the robot is moved from a first work stand to a second work stand which have different heights, a control unit determines whether the difference between the height of the imaging units before the moving of the robot and the height of the second work stand is present in a predetermined range, and when the control unit determines that the difference is not present in the predetermined range, a display unit controls a display device to display information that instructs a user to change the height of the imaging units via the operation portion.

7 Claims, 12 Drawing Sheets

(56) References Cited

U.S. PATENT DOCUMENTS

| | | | |
|---|---|---|---|
| 2015/0134099 A1* | 5/2015 | Hishikawa | G05B 19/402 700/114 |
| 2015/0158176 A1* | 6/2015 | Fujita | B25J 9/1697 700/97 |
| 2015/0197006 A1* | 7/2015 | Ishige | B25J 9/0096 700/259 |
| 2015/0251317 A1* | 9/2015 | Matsukuma | B25J 9/1697 700/259 |

* cited by examiner

| ITEM | | ITEM 2 | VALUE | VARIABLE | VALUE | VARIABLE | VALUE |
|---|---|---|---|---|---|---|---|
| CAMERA VISUAL FIELD | | HORIZONTAL | $\theta_x = 50°$ | $\tan\theta_x/2$ | 0.4663 | $e_x$ | 2.1445 |
| | | VERTICAL | $\theta_y = 50°$ | $\tan\theta_y/2$ | 0.4663 | $e_y$ | 2.1445 |
| ROTATION OF CAMERA | | ABOUT X AXIS | $\alpha° = 210°$ | $s_x$ | −0.5 | $c_x$ | −0.8660 |
| | | ABOUT Y AXIS | $\beta° = \pm 20°$ | $s_y$ | $\pm 0.3420$ | $c_y$ | 0.9396 |
| | | ABOUT Z AXIS | 0° | $s_z$ | 0.0 | $c_z$ | 1.0 |
| TRANSLATION OF CAMERA | | IN DIRECTION OF X AXIS | $C_x = \pm 150$ (mm) | | | | |
| | | IN DIRECTION OF Y AXIS | $C_y = 100$ mm | | | | |
| | | IN DIRECTION OF Z AXIS | $C_z$ | (※ CALCULATED AS UNKNOWN VARIABLE) | | | |
| DEPTH OF FIELD | | $dn = 300$ (mm) | $df = 1000$ (mm) | | | | |

FIG. 17

ROBOT, ROBOT SYSTEM, ROBOT CONTROL DEVICE AND ROBOT CONTROL METHOD

BACKGROUND

1. Technical Field

The present invention relates to a robot, a robot system, a robot control device and a robot control method.

2. Related Art

A technology disclosed in JP-A-2011-51056 proposes a working robot, in which when the working robot is placed in a work place, and co-exists and cooperates with a human, the working robot can be disposed even though an obstacle is present on a floor in the vicinity of the work place, the safety of an operator can be secured when the working robot is disposed, and a large amount of change in work instruction is not required for high-precision positioning.

There is a robot that includes a camera that captures images of the top of a work stand, and performs work on the work stand based on data of the images captured by the camera. For example, in such a robot, the height of the camera is fixed with respect to the work stand. For this reason, whenever changing the height of the work stand, it is necessary to adjust the height of the robot, and it takes labor and time to adjust the height.

SUMMARY

An advantage of some aspects of the invention is to reduce labor and time required to operate a robot when the height of a work stand is changed.

A first aspect of the invention is directed to a robot including imaging units, in which when the robot is moved from a first work stand to a second work stand which have different heights, and the difference between the height of the imaging units before the moving of the robot and the height of the second work stand is not present in a predetermined range, the robot displays an instruction indicative of a change in the height of the imaging units. According to the first aspect, when the difference between the height of the imaging units before the moving of the robot and the height of the second work stand is not present in the predetermined range, the robot may display an instruction indicative of a change in the height of the imaging units. Accordingly, when an instruction indicative of a change in the height of the imaging units is displayed, a user preferably changes the height of the imaging units of the robot, and it is possible to reduce labor and time required to operate the robot when the height of the work stand is changed.

A value of change in the height of the imaging unit may be displayed. With this configuration, the user preferably elevates or lowers the imaging units based on the displayed height, and it is possible to reduce labor and time required to operate the robot when the height of the work stand is changed.

The work region of the robot performing work on the first work stand may be present in a visual field range of the imaging units. With this configuration, when the work stand is moved to the second work stand from the first work stand at which the work region of the robot is present in the visual field range of the imaging units, and the difference between the height of the imaging units before the movement and the height of the second work stand is not present in a predetermined range, the height of the imaging units is preferably changed, and it is possible to reduce labor and time required to operate the robot when the height of the work stand is changed.

The predetermined range may be determined based on the distance between two imaging units, the viewing angle of each of the two imaging units, the depth of field of the two imaging units, the rotation of each of the two imaging units, the translational position of each of the two imaging units, and the work region in which the robot performs work. With this configuration, when the difference between the height of the imaging units before the movement and the height of the second work stand is not present in the predetermined range that is determined based on the distance between two imaging units, the viewing angle of each of the two imaging units, the depth of field of the two imaging units, the rotation of each of the two imaging units, the translational position of each of the two imaging units, and the work region in which the robot performs work, the user preferably changes the height of the imaging units, and it is possible to reduce labor and time required to operate the robot when the height of the work stand is changed.

The predetermined range may be determined based on the ratio between the work regions which occupy the fields of view of the two imaging units, respectively. With this configuration, when the difference between the height of the imaging units before the movement and the height of the second work stand is not present in the predetermined range that is determined based on the ratio between the work regions which occupy the fields of view of the two imaging units, respectively, the user preferably changes the height of the imaging units, and it is possible to reduce labor and time required to operate the robot when the height of the work stand is changed.

A second aspect of the invention is directed to a robot including imaging units, in which when the robot is moved from a first work region to a second work region which have different heights, and the difference between the height of the imaging units before the moving of the robot and the height of the second work region is not present in a predetermined range, the robot displays an instruction indicative of a change in the height of the imaging units. According to the second aspect, when the difference between the height of the imaging units before the movement and the height of the second work region is not present in the predetermined range, the robot may display information that instructs a user to change the height of the imaging units. Accordingly, when information that instructs the user to change the height of the imaging units is displayed, the user preferably changes the height of the imaging units of the robot, and it is possible to reduce labor and time required to operate the robot when the height of the work stand is changed.

A third aspect of the invention is directed to a robot system including a robot; and a robot control device, in which the robot includes imaging units, and when the robot is moved from a first work stand to a second work stand which have different heights, and the difference between the height of the imaging units before the moving of the robot and the height of the second work stand is not present in a predetermined range, the robot control device displays an instruction indicative of a change in the height of the imaging units. According to the third aspect, when the difference between the height of the imaging units before the movement and the height of the second work stand is not present in the predetermined range, the robot control device may display information that instructs a user to change the height of the imaging units. Accordingly, when information that instructs the user to change the height of the imaging units is displayed, the user preferably changes the height of the imaging units of the robot, and it is possible to reduce labor and time required to operate the robot when the height of the work stand is changed.

A fourth aspect of the invention is directed to a robot including imaging units, in which when the robot is moved from a first work stand to a second work stand which have different heights, and the difference between the height of the imaging units before the moving of the robot and the height of the second work stand is not present in a predetermined range, the robot changes the height of the imaging units. According to the fourth aspect, when the difference between the height of the imaging units before the movement and the height of the second work stand is not present in the predetermined range, the robot may change the height of the imaging units. Accordingly, since the robot changes the height of the imaging units, it is possible to reduce labor and time required of the user to operate the robot.

A fifth aspect of the invention is directed to a robot control device, in which when a robot is moved from a first work stand to a second work stand which have different heights, and the difference between the height of imaging units before the moving of the robot and the height of the second work stand is not present in a predetermined range, the robot control device displays an instruction indicative of a change in the height of the imaging units. According to the fifth aspect, when the difference between the height of the imaging units before the moving of the robot and the height of the second work stand is not present in the predetermined range, the robot control device may display information that instructs a user to change the height of the imaging units. Accordingly, when information that instructs the user to change the height of the imaging units is displayed, the user preferably changes the height of the imaging units of the robot, and it is possible to reduce labor and time required to operate the robot when the height of the work stand is changed.

A sixth aspect of the invention is directed to a robot control method including: displaying an instruction indicative of a change in the height of the imaging units, when a robot is moved from a first work stand to a second work stand which have different heights, and the difference between the height of imaging units before the moving of the robot and the height of the second work stand is not present in a predetermined range. According to the sixth aspect, when the difference between the height of the imaging units before the moving of the robot and the height of the second work stand is not present in the predetermined range, information that instructs a user to change the height of the imaging units may be displayed. Accordingly, when information that instructs the user to change the height of the imaging units is displayed, the user preferably changes the height of the imaging units of the robot, and it is possible to reduce labor and time required to operate the robot when the height of the work stand is changed.

BRIEF DESCRIPTION OF THE DRAWINGS

The invention will be described with reference to the accompanying drawings, wherein like numbers reference like elements.

FIG. 17 is a table illustrating specific parameter values for calculating the height of the imaging units.

DESCRIPTION OF EXEMPLARY EMBODIMENTS

Figure 1:
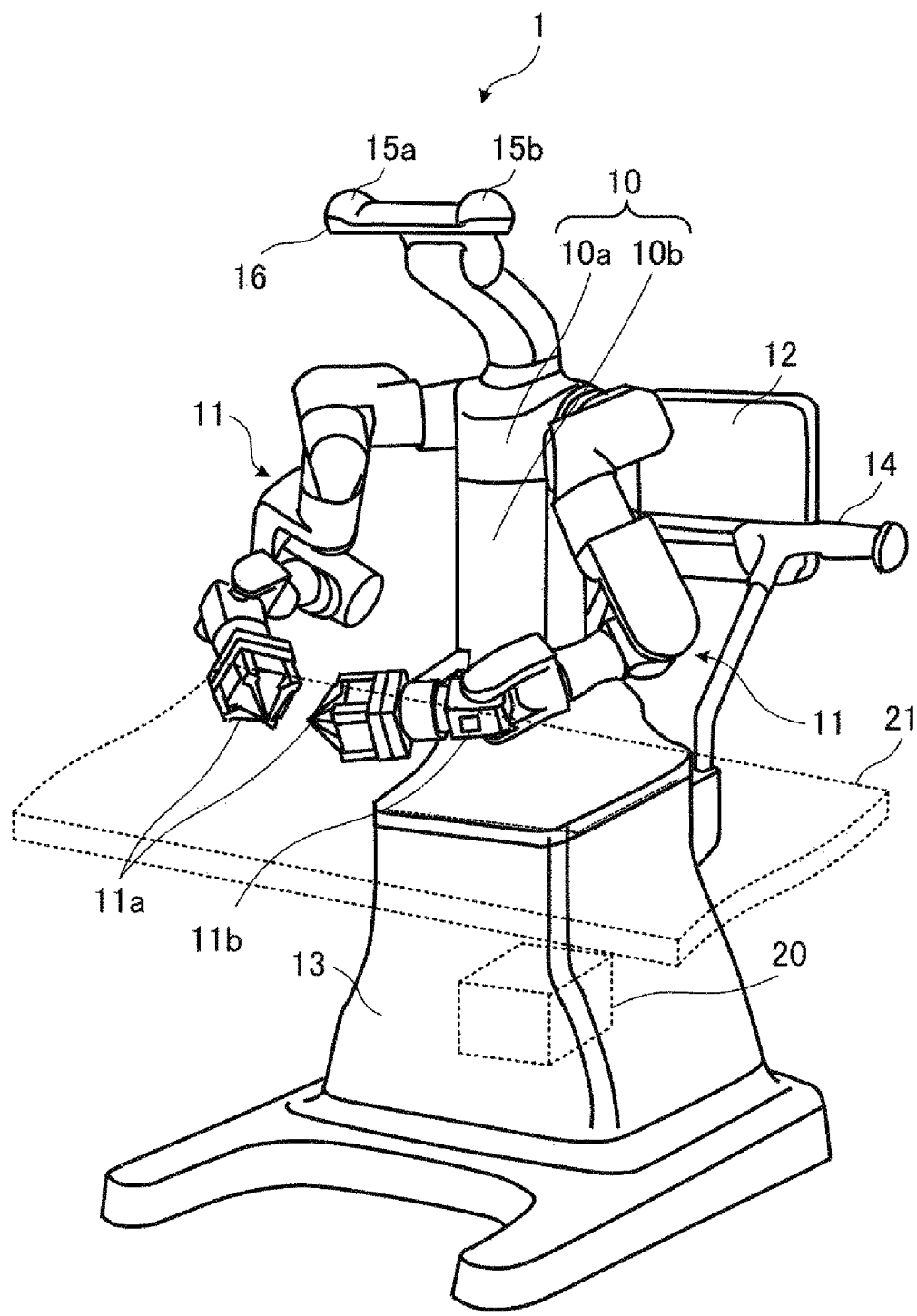
FIG. 1 is a front perspective view of a robot according to an embodiment of the invention.
Figure 2:
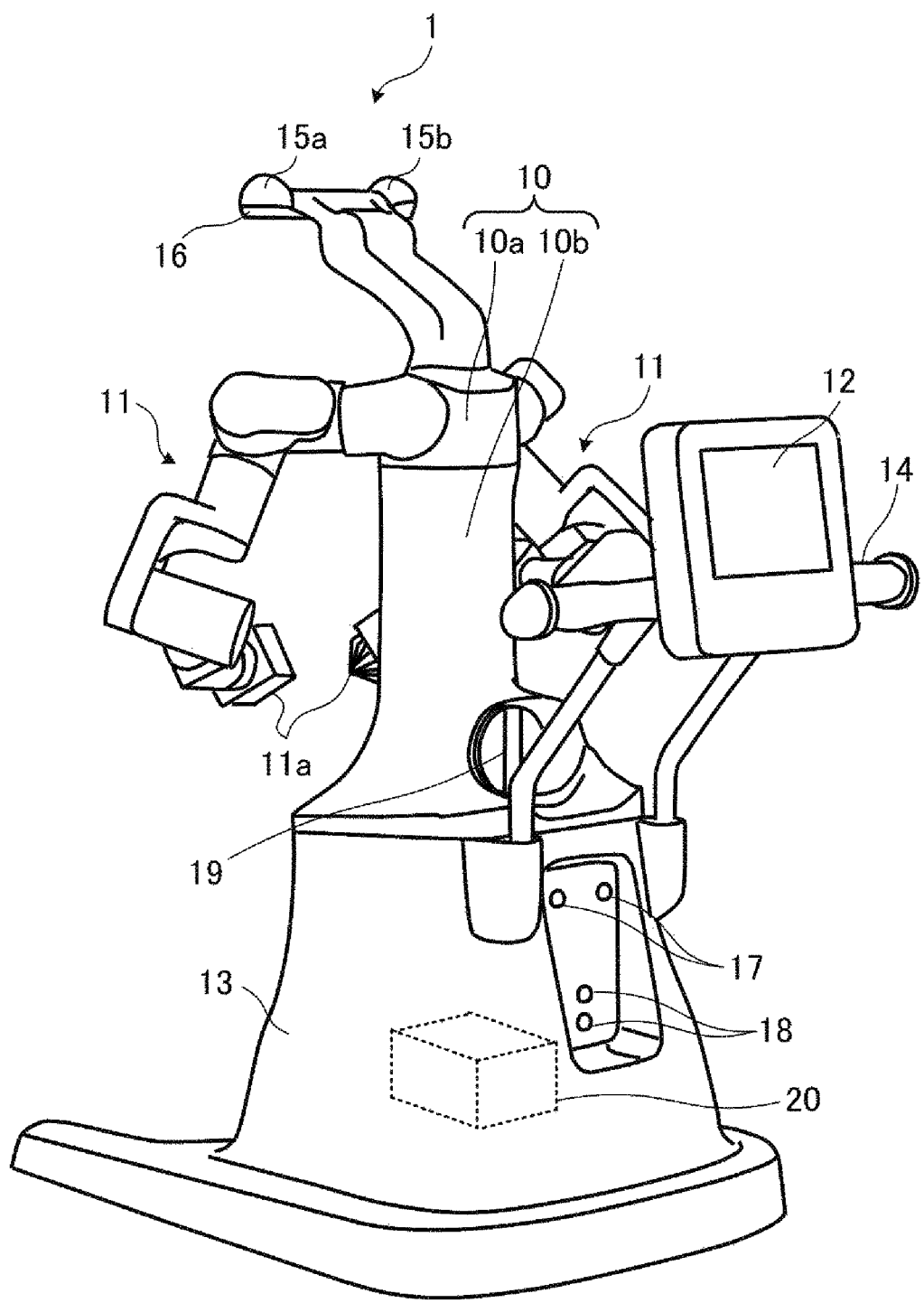
FIG. 2 is a rear perspective view of the robot.

FIG. 1 is a front perspective view of a robot 1 according to an embodiment of the invention. FIG. 2 is a rear perspective view of the robot 1. As illustrated in FIGS. 1 and 2, the robot 1 includes a trunk portion 10; arms 11; a display device 12; a leg portion 13; a carrier handle 14; two imaging units 15a and 15b; a signal lamp 16; a power source switch 17; an external connection terminal 18; an operation portion 19; and a robot control device 20. In FIG. 1, a work stand 21 on which the robot 1 performs work is illustrated by the dotted line (in FIG. 2, the work stand 21 is not illustrated).

The robot 1 is a humanoid dual arm robot, and carries out processes according to a control signal from the robot control device 20 built in the leg portion 13. For example, the robot 1 can be used in a manufacturing process in which precision equipment such as a wrist watch is manufactured. The manufacturing work is typically performed on the work stand 21 installed in front of the trunk portion 10.

In the following description, for descriptive purposes, a higher side in FIGS. 1 to 3 may be expressed using the terms of "on" or "upward", and a lower side may be expressed using the terms of "below" or "downward". A front side in FIG. 1 may be referred to as a "front face side" or a "front face", and a front side in FIG. 2 may be referred to as a "back face side" or a "back face".

The arms 11 are respectively provided in the vicinity of a higher end of each side face of the trunk portion 10. The tip of the arm 11 is provided with a hand 11a for holding a workpiece or a tool. The position of the hand 11a is the position of an end point of the arm 11. The arm 11 is provided with a hand-eye camera 11b that captures images of a workpiece and the like placed on the work stand 21.

The arm 11 can be referred to as a type of manipulator. The manipulator is a mechanism that changes the position of the end point, and is not limited to an arm, and various manipulators can be used. For example, if the manipulator is configured to include one or more joints and links, and the motion of the joints allows the entirety of the manipulator to move, the manipulator may have any form. The number of manipulators of the robot 1 is not limited to two, and may be one, or three or more.

The hand 11a can be referred to as a type of end effector. The end effector is a member for holding, pressing, lifting, hanging, suctioning a target, or machining a workpiece. The end effector can have various forms such as a hand, a hook, or a suction disk. A single arm may be provided with a plurality of the end effectors.

The trunk portion 10 is provided on a frame of the leg portion 13. The leg portion 13 is a base of the robot, and the trunk portion 10 is a trunk of the robot.

The robot control device 20 for controlling the robot 1 is provided inside the leg portion 13. A rotation shaft is provided inside the leg portion 13, and a shoulder region 10a of the trunk portion 10 is provided on the rotation shaft.

The power source switch 17 and the external connection terminal 18 are provided on a back face of the leg portion 13, and the robot control device 20 built in the leg portion 13 is connected to an external PC and the like via the external connection terminal 18. The power source switch 17 has a power ON switch to allow the supply of electrical power to the robot 1, and a power OFF switch to shut off the supply of electrical power to the robot 1.

A plurality of casters (not illustrated) are installed at the lowest portion of the leg portion 13 while being separated from each other in a horizontal direction. Accordingly, a user can move and carry the robot 1 by pushing the carrier handle 14 or the like.

The imaging units 15a and 15b having an electronic camera such as a charge coupled device (CCD) and a complementary metal oxide semiconductor (CMOS), and the signal lamp 16 are provided in a portion of the robot 1 which is equivalent to a head portion, and protrudes upwards from the trunk portion 10.

The imaging units 15a and 15b form a stereo camera. The imaging units 15a and 15b capture images of the work stand 21 and a work region on the work stand 21. The work region is a region on the work stand 21, in which the robot 1 performs work. For example, the signal lamp 16 has LEDs emitting red color light, yellow color light, or blue color light, and the LEDs emit light appropriately and selectively in response to a current state of the robot 1.

The display device 12 is disposed behind a back face of the trunk portion 10, and is visible from a direction of the back face of the robot 1. For example, the display device 12 is a liquid crystal monitor, and can display a current state of the robot 1 and the like. In addition, for example, the display device 12 functions as a touch panel, and is used as an input unit through which the motions to be performed by the robot 1 are set.

The operation portion 19 is provided on the back face of the trunk portion 10. The user moves the shoulder region 10a and the imaging units 15a and 15b vertically with respect to a trunk portion main body 10b by operating the operation portion 19. Here, the shoulder region 10a is the highest portion of the trunk portion 10, and the imaging unit 15a and 15b are provided in the head portion that protrudes upward from the shoulder region 10a.

Figure 3:
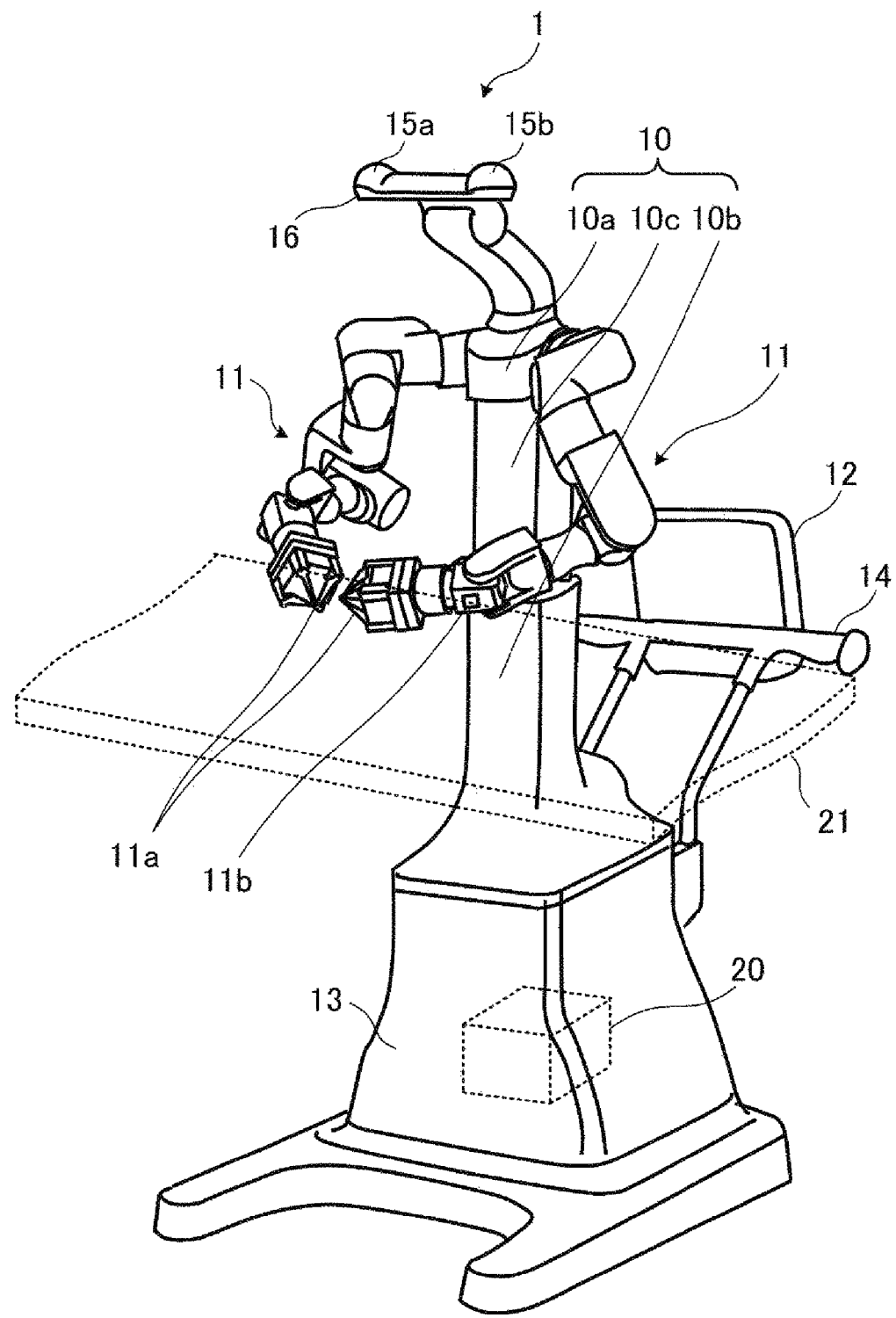
FIG. 3 is a front perspective view of the robot in a state in which a shoulder region and imaging units are moved upwards compared to the robot in FIG. 1.

FIG. 3 is a front perspective view of the robot 1 in a state in which the shoulder region 10a and the imaging units 15a and 15b are moved upward compared to the robot 1 in FIG. 1. In FIG. 3, the same reference signs are assigned to the same portions as in FIG. 1.

As illustrated in FIG. 3, the trunk portion 10 has an elevating portion 10c. The elevating portion 10c is accommodated in the trunk portion main body 10b, and moves upward out of the trunk portion main body 10b. The elevating portion 10c comes out of or enters the trunk portion main body 10b, and thereby this can move the shoulder region 10a and the imaging units 15a and 15b in the vertical direction.

For example, the operation portion 19 is an elevation handle. For example, a pinion gear is provided at the tip of the shaft of the elevation handle, and a rack gear is provided in the elevating portion 10c of the trunk portion 10. The pinion gear of the elevation handle is engaged with the rack gear of the elevating portion 10c, and the rotation of the elevation handle makes the elevating portion 10c move in the vertical direction.

That is, when the user operates the operation portion 19, the elevating portion 10c moves in the vertical direction. Accordingly, when the user operates the operation portion 19, the shoulder region 10a and the imaging units 15a and 15b move in the vertical direction. In addition, the robot 1 can cope with the work stand 21 being at different heights.

In the description above, the main configurations of the robot 1 are illustrated to describe the features of the embodiment, and the invention is not limited to the example of the configuration illustrated. The invention does not exclude a typical configuration of a robot. For example, the number of joints (referred to as "the number of axes") or the number of links may be increased. The shape, the size, the disposition, the structure or the like of each of various members such as a joint, a link, and a hand may be appropriately changed.

Figure 4:
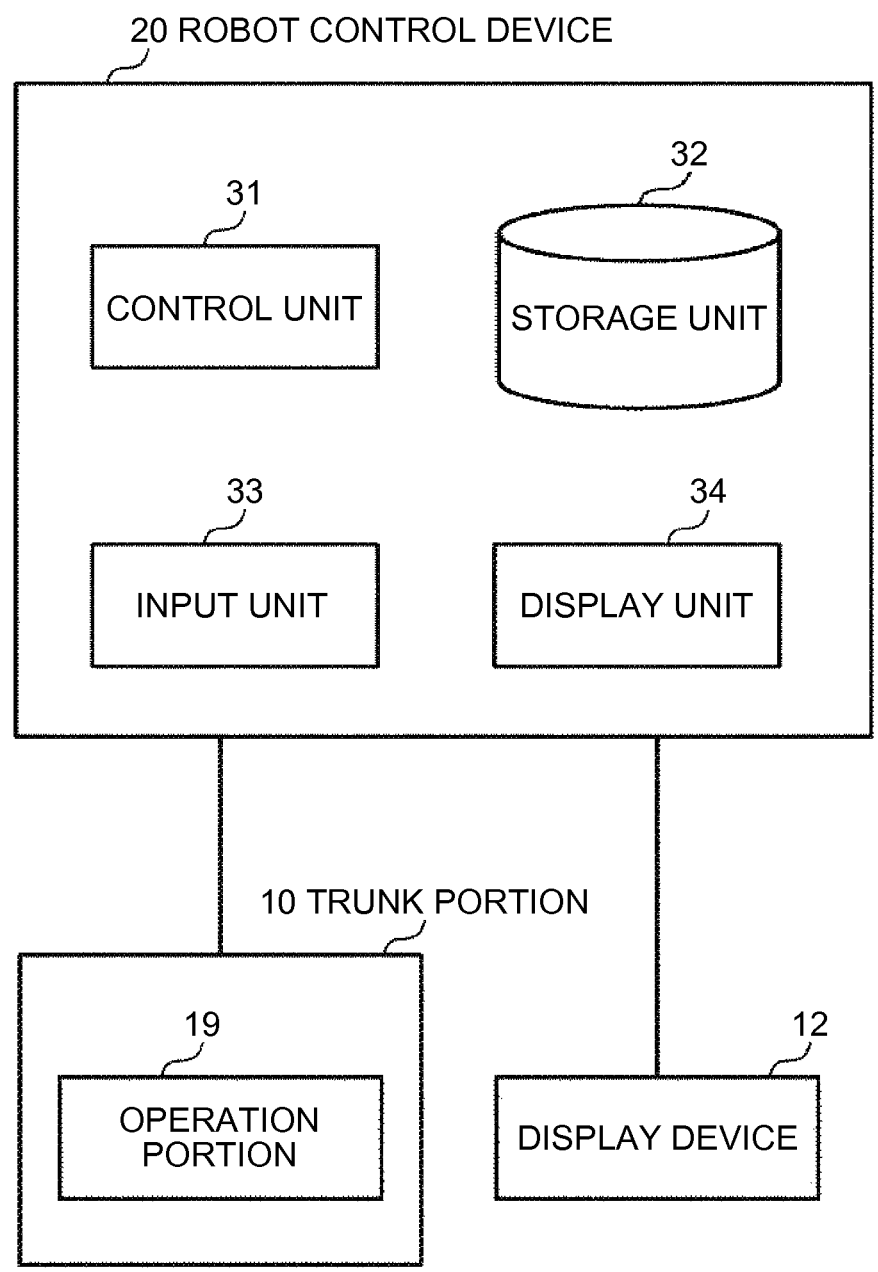
FIG. 4 illustrates an example of the functional configurations of a robot control device.

FIG. 4 illustrates an example of the functional configurations of the robot control device 20. As illustrated in FIG. 4, the robot control device 20 has a control unit 31; a storage unit 32; an input unit 33; and a display unit 34. FIG. 4 illustrates the trunk portion 10, the operation portion 19, and the display device 12 which are illustrated in FIGS. 1 to 3, in addition to the robot control device 20.

For example, the control unit 31 performs component assembly work via at least one controlling operation of visual servoing, position control, and force control. For example, the control unit 31 controls the motion of the arm 11 and the hand 11a based on data of image captured by the imaging units 15a and 15b, and performs component assembly work.

When the work stand 21 is moved from a first height to a second height, the control unit 31 determines whether the distance between the imaging units 15a and 15b when the work stand 21 is positioned at the first height, and the work stand 21 at the second height is within a predetermined range.

The storage unit 32 stores information regarding the visual field range of the imaging units 15a and 15b.

The input unit 33 receives information that the user inputs via a touch panel of the display device 12.

When the control unit 31 determines that the distance between the imaging units 15a and 15b when the work stand 21 is positioned at the first height, and the work stand 21 at the second height is not within the predetermined range, the display unit 34 controls the display device 12 to display information that instructs the user to change the height of the imaging units 15a and 15b via the operation portion 19.

FIGS. 5A to 5D are views illustrating the operation of the control unit 31 and the display unit 34. FIGS. 5A to 5D illustrate the imaging units 15a and 15b and the work stand 21 which are illustrated in FIGS. 1 to 3.

Figure 5A:
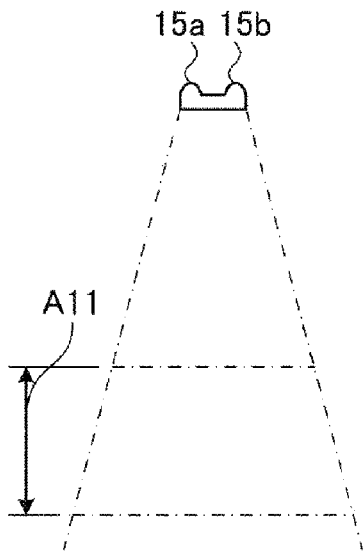
FIGS. 5A to 5D are views illustrating the operation of a control unit and a display unit.

The imaging units 15a and 15b have a visual field range in which the imaging units 15a and 15b appropriately capture images of the entirety of a target. Arrow A11 in FIG. 5A illustrates the visual field range of the imaging units 15a and 15b. When a target is present in the visual field range illustrated by arrow A11, the imaging units 15a and 15b can appropriately capture the images of the target. FIG. 5A illustrates the visual field range in two dimensions (height direction and horizontal direction (lateral direction of the sheet of the drawing)), but the visual field range is present in three dimensions (height direction, horizontal direction, and vertical direction (direction perpendicular to the sheet of the drawing)) (the same applies to FIGS. 5B to 5D).

It is possible to change the height of the imaging units 15a and 15b via the operation portion 19. Accordingly, even though a target is not present in the visual field range illustrated by arrow A11, the height of the imaging units 15a and 15b is adjusted in order for the target to be present in the visual field range of the imaging units 15a and 15b, and thereby the imaging units 15a and 15b can appropriately capture images of the target.

Figure 5B:
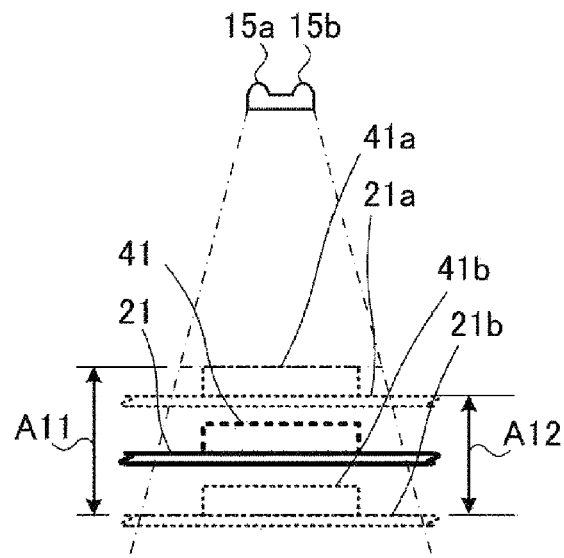

The movable range of the arm 11 and the like of the robot 1 is limited to a certain level. For this reason, there is present a work region which is appropriate for the robot 1 to perform component assembly work or the like. That is, the robot 1 performs work in the work region on the work stand 21. FIG. 5B illustrates the work stand 21 and a work region 41 on the work stand 21, in which the robot 1 performs work. FIG. 5B illustrates the work region in two dimensions (height direction and horizontal direction (lateral direction of the sheet of the drawing)), but the visual field range is present in three dimensions (height direction, horizontal direction, and vertical direction (direction perpendicular to the sheet of the drawing)) (the same applies to FIGS. 5C and 5D).

When the work region 41 is present in the visual field range illustrated by arrow A11, the imaging units 15a and 15b can appropriately capture the images of the work region 41. Accordingly, the robot 1 can appropriately perform component assembly work or the like based on data of the image that is appropriately captured by the imaging units 15a and 15b. Arrow A12 illustrated in FIG. 5B illustrates the height range of the work stand 21, in which the work region 41 of the robot 1 becomes present in the visual field range of the imaging units 15a and 15b. That is, when the height of the work stand 21 is present in the range illustrated by arrow A12, the work region 41 becomes present in the visual field range of the imaging units 15a and 15b illustrated by arrow A11.

For example, a work stand 21a illustrated by the dotted line is present in the range illustrated by arrow A12, and a work region 41a on the work stand 21a is present in the visual field range of the imaging units 15a and 15b illustrated by arrow A11. In addition, a work stand 21b in FIG. 5B is present in the range illustrated by arrow A12, and a work region 41b on the work stand 21b is present in the visual field range of the imaging units 15a and 15b illustrated by arrow A11.

The range illustrated by arrow A12 is determined based on the distance between the imaging units 15a and 15b, the viewing angle of each of the imaging units 15a and 15b, the depth of field of the imaging units 15a and 15b, the rotation (elevation angle and convergence angle) of each of the imaging units 15a and 15b, the translational position of each of the imaging units 15a and 15b, and the work region in which the robot 1 performs work. The range illustrated by arrow A12 is determined based on the ratio between the work regions which occupy the angles of view of the imaging units 15a and 15b, respectively.

The height of the work stand 21 may be changed. For example, when the robot 1 is moved from one work place to another work place in order to make the robot 1 perform another work, the height (first height) of the work stand before the moving of the robot 1 may differ from the height (second height) of a destination work stand. When the work stand 21 is moved from the first height to the second height, the control unit 31 determines whether the distance ("a" illustrated in FIG. 5C) between the imaging units 15a and 15b when the work stand 21 is positioned at the first height, and the work stand 21 at the second height is in the predetermined range.

Figure 5C:
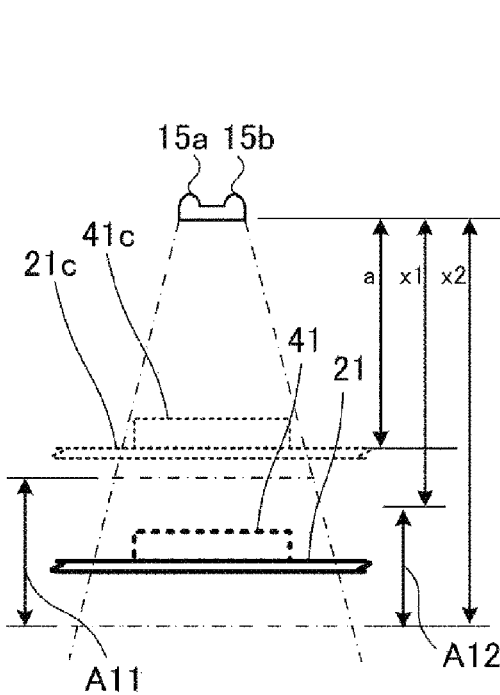

For example, FIG. 5C illustrates the position of the work stand 21 before the robot 1 is moved (at the first height). FIG. 5C illustrates the position of the imaging units 15a and 15b before the robot 1 is moved, and the imaging units 15a and 15b are positioned at a height at which the imaging units 15a and 15b can appropriately capture images of the work region 41 on the work stand 21 before the moving of the robot 1.

For example, in this state (the height of the imaging units 15a and 15b is not changed, that is, the height of the imaging units 15a and 15b remains unchanged as illustrated in FIG. 5C), the robot 1 is moved to the work stand at the second height. The dotted line in FIG. 5C illustrates the work stand 21 after the moving of the robot 1 (at the second height), and a distance a indicates the distance between the imaging units 15a and 15b before the moving of the robot 1 and the work stand 21c at the second height (indicates the difference between the height of the imaging units 15a and 15b before the moving of the robot 1 and the height of the work stand 21c). A distance x1 indicates the distance between the imaging units 15a and 15b before the moving of the robot 1 and the work stand 21 when the work region 41 is present in the visual field range (arrow A11) of the imaging units 15a and 15b, and the work stand 21 is closest to the imaging units 15a and 15b. A distance x2 indicates the distance between the imaging units 15a and 15b before the moving of the robot 1 and the work stand 21 when the work region 41 is present in the visual field range (arrow A11) of the imaging units 15a and 15b, and the work stand 21 is farthest from the imaging units 15a and 15b. Accordingly, the control unit 31 determines whether the distance a (distance between the imaging units 15a and 15b when the work stand 21 is positioned at the first height, and the work stand 21c at the second height) is present between the distance x1 and the distance x2 (in a predetermined range).

The difference between the distance x1 and the distance x2 illustrated by arrow A12 indicates the height range of the work stand 21, in which the work region 41 of the robot 1 is present in the visual field range of the imaging units 15a and 15b. In the example illustrated in FIG. 5C, a work region 41c of the work stand 21c at the second height is not present in the visual field range of the imaging units 15a and 15b before the moving of the robot 1. Accordingly, the control unit 31 determines that the distance between the imaging units 15a and 15b when the work stand 21 is positioned at the first height, and the work stand 21c at the second height is not present in the predetermined range. At this time, in a case where the height of the imaging units 15a and 15b before the moving of the robot 1 remains unchanged, since the imaging units 15a and 15b cannot appropriately capture images of the work region 41c on the work stand 21c after the moving of the robot 1, it is necessary to change the height of the imaging units 15a and 15b.

When the control unit 31 determines that the distance between the imaging units 15a and 15b when the work stand 21 is positioned at the first height, and the work stand 21c at the second height is not present in the predetermined range, the display unit 34 controls the display device 12 to display information that instructs the user to change the height of the imaging units 15a and 15b via the operation portion 19. Accordingly, the user can recognize that it is necessary to change the height of the imaging units 15a and 15b when the user moves the robot 1 to a new work stand, or the robot 1 is moved. The user can change the height of the imaging units 15a and 15b via the operation portion 19 in such a manner that the work region of the work stand at the second height becomes present in the visual field range of the imaging units 15a and 15b.

Figure 5D:
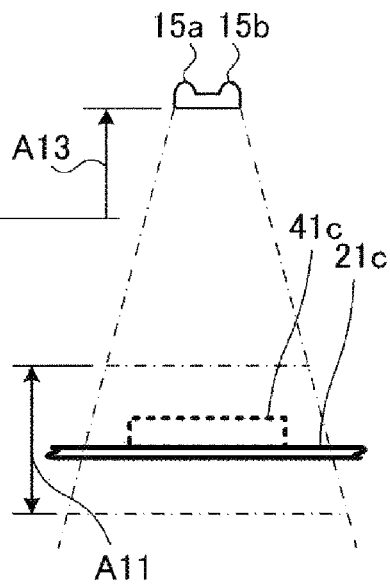

For example, the work stand 21c and the work region 41c in FIG. 5D correspond to the work stand 21c and the work region 41c in FIG. 5C, respectively. As described above, the work region 41c after the moving of the robot 1 is not present in the visual field range of the imaging units 15a and 15b at the height before the movement. Accordingly, the display device 12 displays information that instructs the user to change the height of the imaging units 15a and 15b via the operation portion 19. The user changes the height of the imaging units 15a and 15b to a height as illustrated by arrow A13 in FIG. 5D, based on an instruction on the display device 12, and thereby the work region 41c becomes present in the visual field range (arrow A11) of the imaging units 15a and 15b.

When the control unit 31 determines that the distance between the imaging units 15a and 15b when the work stand 21 is positioned at the first height, and the work stand 21c at the second height is present in the predetermined range, the display unit 34 does not control the display device 12 to display information that instructs the user to change the height of the imaging units 15a and 15b via the operation portion 19. That is, when the work region of the work stand at the second height is present in the visual field range of the imaging units 15a and 15b at the height before the moving of the robot 1, the display unit 34 controls the display device 12 not to display information that instructs the user to change the height of the imaging units 15a and 15b. Accordingly, even though the robot 1 is moved to the work stand at a different height, the user may not change the height of the imaging units 15a and 15b. That is, it is possible to reduce labor and time required to operate a robot when the height of the work stand is changed.

Hereinafter, the operation of the robot control device 20 will be described with reference to a flowchart.

Figure 6:
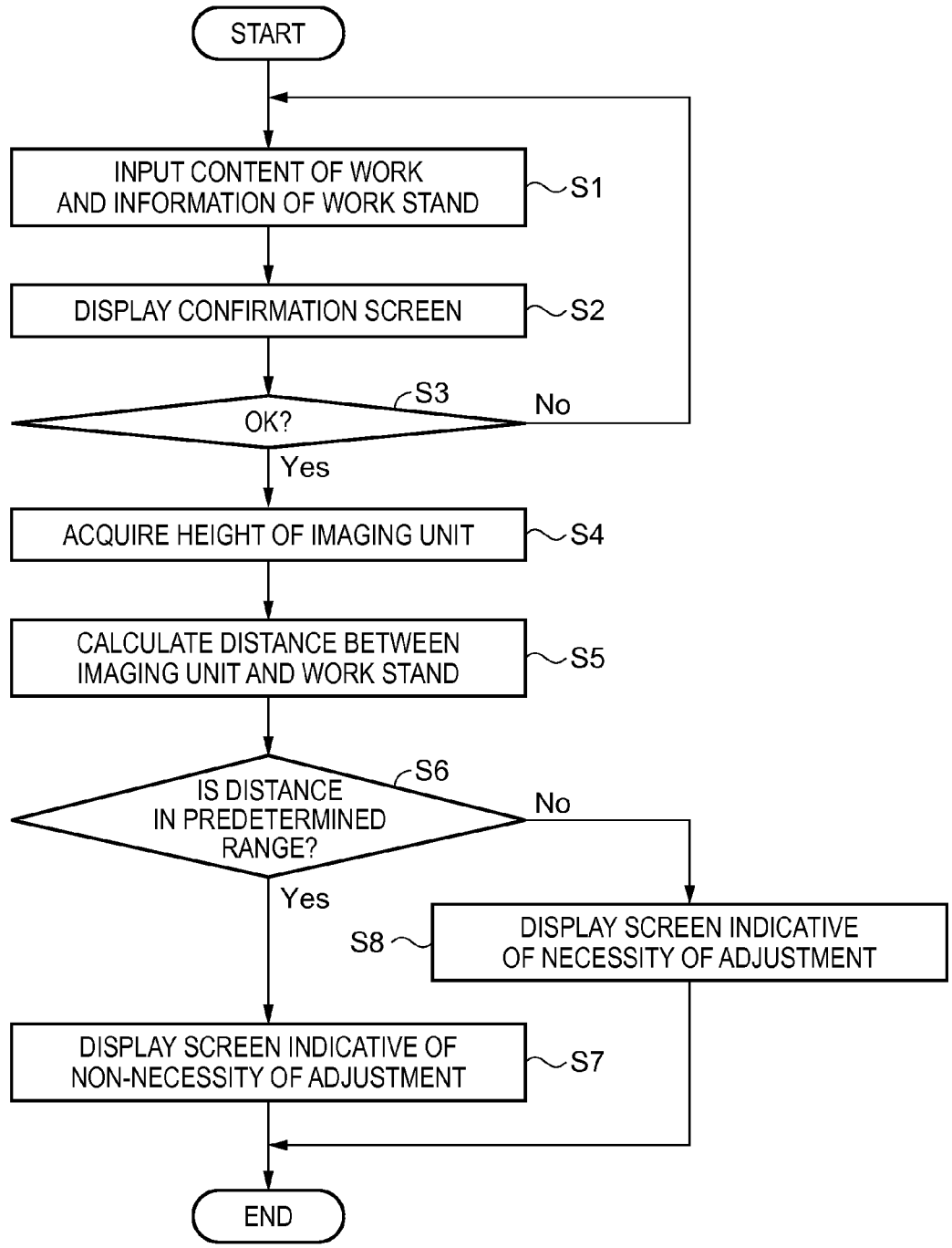
FIG. 6 is a flowchart illustrating an example of the operation of the robot control device.

FIG. 6 is a flowchart illustrating an example of the operation of the robot control device 20. For example, when the height of the work stand 21 for the robot 1 is changed from the first height to the second height, a process in the flowchart illustrated in FIG. 6 is executed.

It assumed that the work region on the work stand 21 at the first height is present in the visual field range of the imaging units 15a and 15b. In addition, it is assumed that the storage unit 32 pre-stores the distances x1 and x2 illustrated in FIG. 5C. That is, it is assumed that the storage unit 32 pre-stores the distance between the imaging units 15a and 15b and the work stand 21 when the work region is present in the visual field range of the imaging units 15a and 15b, and the work stand 21 is closest to the imaging units 15a and 15b. In addition, it is assumed that the storage unit 32 pre-stores the distance between the imaging units 15a and 15b and the work stand 21 when the work region is present in the visual field range of the imaging units 15a and 15b, and the work stand 21 is farthest from the imaging units 15a and 15b.

First, the input unit 33 receives the content of the work to be performed by the robot 1 and information related to a new work stand (for example, work stand at the destination of the robot 1) from the user via the touch panel of the display device 12 (step S1).

Figure 7:
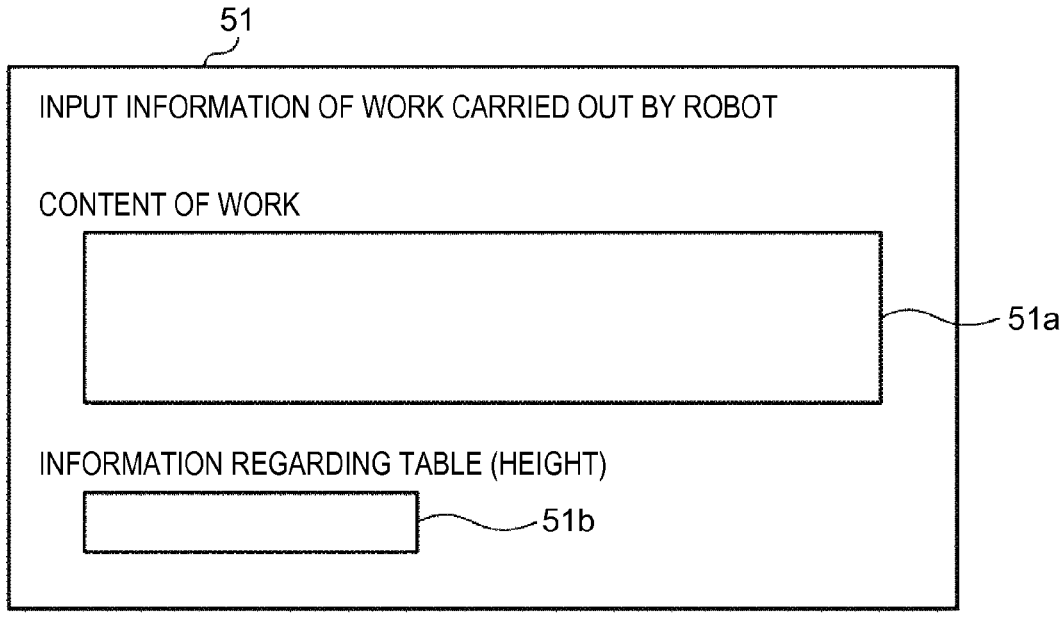
FIG. 7 is a diagram illustrating an example of an information input screen.

FIG. 7 is a diagram illustrating an example of an information input screen. As illustrated in FIG. 7, a screen 51 is displayed on the display of the display device 12. The screen 51 displays an input region 51a and an input region 51b. Here, the input region 51a receives the content of the work from the user, which is performed on the new work stand by the robot 1, and the input region 51b receives the height of the new work stand from the user. For example, the height of the new work stand is the height from the floor. The input unit 33 receives information that is input in the input regions 51a and 51b by the user.

Returning to the description of the flowchart in FIG. 6, subsequently, the display unit 34 controls the display device 12 to display the information input in step S1 (step S2).

Figure 8:
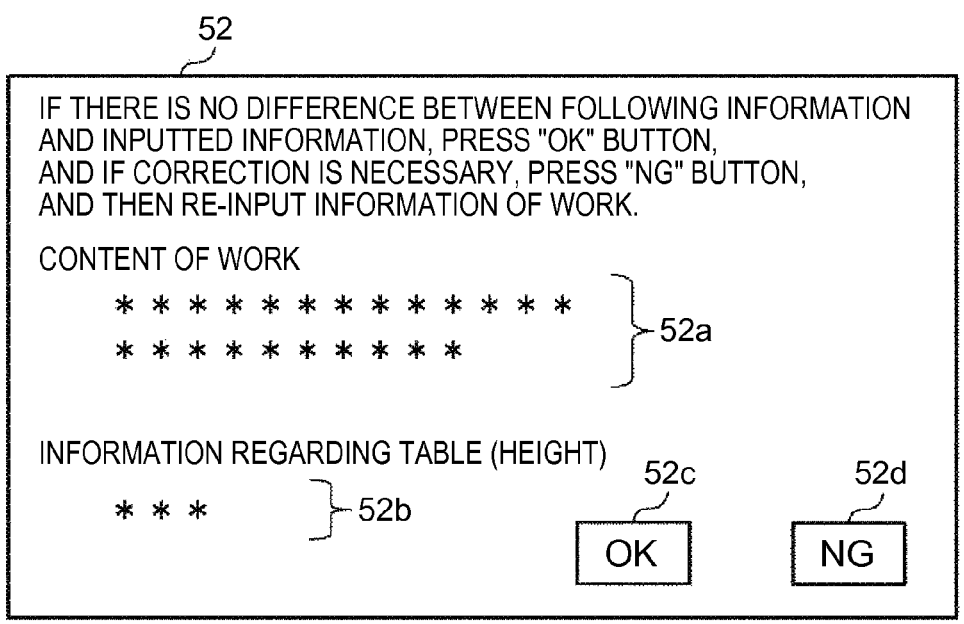
FIG. 8 is a diagram illustrating an example of a confirmation screen.

FIG. 8 is a diagram illustrating an example of a confirmation screen. As illustrated in FIG. 8, a screen 52 is displayed on the display of the display device 12. The screen 52 is a confirmation screen for confirming the information input in step S1.

A display region 52a of the screen 52 displays the information which is input in the input region 51a illustrated in FIG. 7. A display region 52b displays the information which is input in the input region 51b illustrated in FIG. 7. The screen 52 displays buttons 52c and 52d that receive the user's determination of whether to proceed to the next process, which is made based on the information displayed in the display regions 52a and 52b. The button 52c is an "OK" button for proceeding to the next process, and the button 52c is an "NG" button for returning to the process of receiving information from the user again.

Returning to the description of the flowchart in FIG. 6, subsequently, the input unit 33 receives the user's determination of whether to proceed to the next process, which is made based on the information input in step S1 (step S3). For example, the input unit 33 receives the determination of whether the button 52c of the screen 52 is pressed (tapped) or the button 52d of the screen 52 is pressed. When the input unit 33 receives the user's pressing of the button 52c (when the user' determination is "YES"), the process proceeds to step S4. When the input unit 33 receives the user's pressing of the button 52d (when the user's determination is "NO"), the process proceeds to step S1.

When the user's determination is "YES" in step S3, the control unit 31 acquires the height of the imaging units 15a and 15b from the floor (step S4).

The height of the imaging units 15a and 15b from the floor can be acquired using a typical method. For example, the two imaging units 15a and 15b capture an image of the same object (for example, a marker) on the floor, and the control unit 31 can acquire the height of the imaging units 15a and 15b from the floor using the difference (parallax) between the display positions of the object. Alternatively, for example, the control unit 31 can acquire the height of the imaging units 15a and 15b from the floor by counting the rotation frequency of the operation portion 19 rotated by the user, and calculating how much the elevating portion 10c comes out of the trunk portion main body 10b.

Subsequently, the control unit 31 calculates the distance between the imaging units 15a and 15b and the new work stand (step S5). For example, the control unit 31 calculates the distance a illustrated in FIG. 5C.

The control unit 31 calculates the distance between the imaging units 15a and 15b and the new work stand, based on the height of the imaging units 15a and 15b from the floor, which is calculated in step S4, and the height of the new work stand from the floor, which is received in step S1. Specifically, the control unit 31 calculates the distance between the imaging units 15a and 15b and the new work stand by subtracting the height between the new work stand and the floor, from the height between the imaging units 15a and 15b and the floor.

Subsequently, the control unit 31 determines whether the distance between the imaging units 15a and 15b and the new work stand, which is calculated in step S5, is in the predetermined range (step S6).

For example, as described above, the storage unit 32 stores the distance (x1) between the imaging units 15a and 15b and the work stand 21 when the work region is present in the visual field range of the imaging units 15a and 15b, and the work stand 21 is closest to the imaging units 15a and 15b. The storage unit 32 stores the distance (x2) between the imaging units 15a and 15b and the work stand 21 when the work region is present in the visual field range of the imaging units 15a and 15b, and the work stand 21 is farthest from the imaging units 15a and 15b. Accordingly, the control unit 31 determines whether the distance (a) calculated in step S5 is in a range (between x1 and x2) which is defined by the two distances stored in the storage unit 32. When the control unit 31 determines that the distance calculated in step S5 is in the predetermined range (when the result in step S6 is "YES"), the process proceeds to step S7. When the control unit 31 determines that the distance calculated in step S5 is not in the predetermined range (when the result in step S6 is "NO"), the process proceeds to step S8.

When the result in step S6 is "YES", the display unit 34 controls the display device 12 to display information indicating that the user may not change the height of the imaging units 15a and 15b via the operation portion 19 (step S7).

Figure 9:
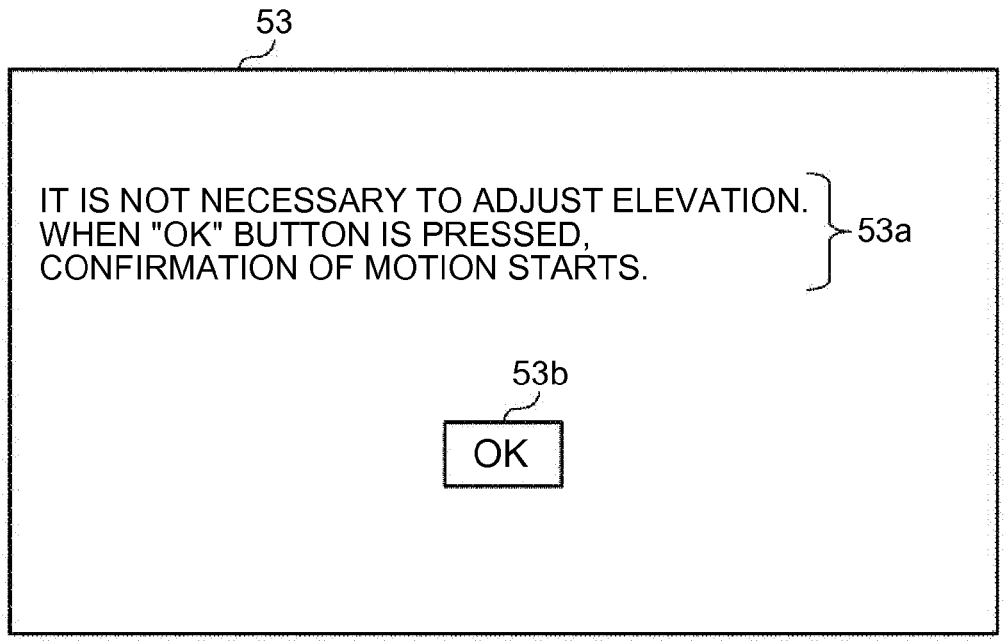
FIG. 9 is a diagram illustrating an example of a screen when a user does not change the height of the imaging units.

FIG. 9 is a diagram illustrating an example of a screen when the user does not change the height of the imaging units 15a and 15b. As illustrated in FIG. 9, a screen 53 is displayed on the display of the display device 12. A display region 53a of the screen 53 displays a message that it is not necessary to adjust the elevation of the imaging units 15a and 15b, and displays a message that when a button 53b is pressed (tapped), the confirmation of the motions to be performed by the robot 1 starts.

Returning to the description of the flowchart illustrated in FIG. 6, when the result in step S6 is "NO", the display unit 34 controls the display device 12 to display information that instructs the user to change the height of the imaging units 15a and 15b via the operation portion 19 (step S8).

Figure 10:
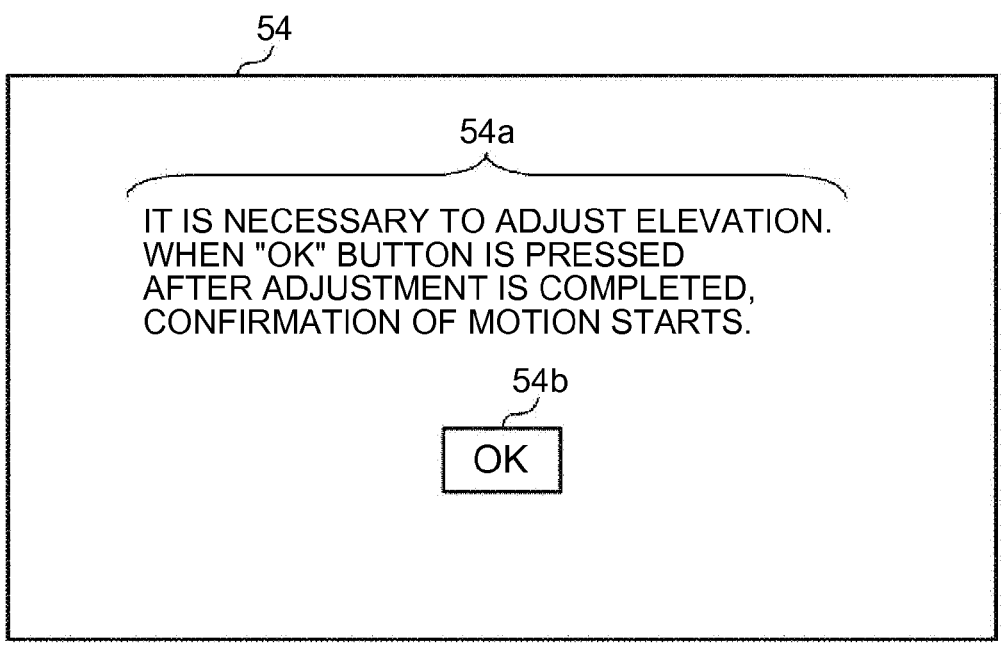
FIG. 10 is a diagram illustrating an example of a screen when the user changes the height of the imaging units.

FIG. 10 is a diagram illustrating an example of a screen when the user changes the height of the imaging units 15a and 15b. As illustrated in FIG. 10, a screen 54 is displayed on the display of the display device 12. A display region 54a of the screen 54 displays a message that it is necessary to adjust the elevation of the imaging units 15a and 15b, and displays a message that when the elevation is adjusted, and then a button 54b is pressed (tapped), the confirmation of the motions to be performed by the robot 1 starts.

For example, when the user changes the height of the imaging units 15a and 15b, the user may change the height of the imaging units 15a and 15b by the amount of difference between the heights of the work stand before and after the change. For example, the user may change the height of the imaging units 15a and 15b by the amount of difference between the height of the work stand 21 illustrated in FIG. 5C and the height of the work stand 21c illustrated in FIG. 5D. More specifically, when the height of the work stand after the change is higher than that of the work stand before the change, the user increases the height of the imaging units 15a and 15b by the amount of difference between the heights of the work stand before and after the change. In contrast, when the height of the work stand after the change is lower than that of the work stand before the change, the user decreases the height of the imaging units 15a and 15b by the amount of difference between the heights of the work stand before and after the change. Accordingly, after the height of the imaging units 15a and 15b is changed, the work region on the work stand becomes present in the visual field range of the imaging units 15a and 15b.

The process is divided into the unit processes illustrated in the flowchart according to the main process content for easy understanding of the process executed by the robot control device 20. The invention is not limited to the method of dividing the process into the unit processes or the name of the unit process. The process executed by the robot control device 20 can be divided into many more unit processes according to the process content. The process can be divided so that a unit process contains many processes. In addition, the sequence of the processes illustrated in the flowchart is not limited to the example illustrated.

Subsequently, an example of a hardware configuration for realizing the function of the robot control device 20 will be described.

Figure 11:
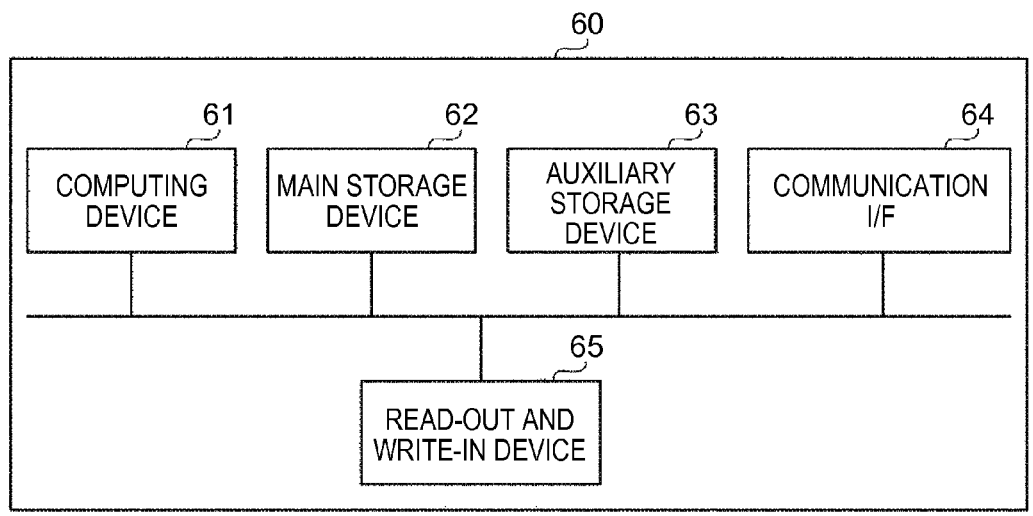
FIG. 11 is a block diagram illustrating an example of a hardware configuration to realize the function of the robot control device.

FIG. 11 is a block diagram illustrating the hardware configuration for realizing the function of the robot control device 20.

For example, as illustrated in FIG. 11, the robot control device 20 can be realized by a computer 60 that includes a computing device 61 such as a central processing unit (CPU); a main storage device 62 such as a random access memory (RAM); an auxiliary storage device 63 such as a hard disk drive (HDD); a communication interface (I/F) 64 for connecting with a communication network non-wirelessly or wirelessly; and a read-out and write-in device 65 that reads and writes information with respect to a portable storage medium such as a digital versatile disk (DVD).

For example, the functions of the control unit 31, the input unit 33, and the display unit 34 are realized when the computing device 61 executes a predetermined program that is loaded from the auxiliary storage device 63 or the like to the main storage device 62. For example, the function of the storage unit 32 is realized when the computing device 61 uses the main storage device 62 or the auxiliary storage device 63. Communication between the robot control device 20 and the display device 12 and between the robot control device 20 and the touch panel of the display device 12 is realized by the communication I/F 64.

For example, the predetermined program may be installed from the storage medium that can be read by the read-out and write-in device 65, or may be installed from the network via the communication I/F 64.

For example, a part or the entirety of the functions of the control unit 31, the input unit 33, and the display unit 34 may be realized by a controller substrate with an application specific integrated circuit (ASIC) including a computing device, a storage device, a drive circuit, and the like.

The functional configurations of the robot control device 20 are classified according to the main process content for easy understanding of the configuration of the robot control device 20. The invention is not limited to the method of classifying the configuration elements or the name of the configuration element. The configuration of the robot control device 20 can be classified into many more configuration elements according to the process content. The classification can be done so that a configuration element executes many more processes. In addition, the process of each configuration element may be executed by one hardware unit, or may be executed by a plurality of hardware units.

As such, when the robot 1 is moved from a first work stand to a second work stand which have different heights, it is determined whether the difference between the height of the imaging units 15a and 15b before the movement and the height of the second work stand is present in the predetermined range. When it is determined that the difference between the height of the imaging units 15a and 15b before the movement and the height of the second work stand is not present in the predetermined range, the robot 1 controls the display device 12 to display information that instructs the user to change the height of the imaging units 15a and 15b. Accordingly, it is possible to reduce labor and time required to operate the robot 1 when the height of the work stand is changed.

In the description above, the user changes the height of the imaging units 15a and 15b, and the robot 1 may change the height of the imaging units 15a and 15b.

For example, a motor is provided in the elevating portion 10c, and operates the rack gear of the elevating portion 10c. When the distance between the imaging units 15a and 15b when the work stand 21 is positioned at the first height and the work stand 21 at the second height is not present in the predetermined range, the control unit 31 controls the motor of the elevating portion 10c to rotate and operate the rack gear of the elevating portion 10c. More specifically, when the height of the work stand after the change is higher than that of the work stand before the change, the control unit 31 controls the motor to rotate so that the height of the imaging units 15a and 15b is increased by the amount of difference between the heights of the work stand before and after the change. When the height of the work stand after the change is lower than that of the work stand before the change, the control unit 31 controls the motor to rotate so that the height of the imaging units 15a and 15b is decreased by the amount of difference between the heights of the work stand before and after the change.

Accordingly, when the distance between the imaging units 15a and 15b when the work stand 21 is positioned at the first height and the working stand 21 at the second height is not present in the predetermined range, since the robot 1 changes the height of the imaging units 15a and 15b, it is possible to reduce labor and times required of the user to operate the robot.

For example, the control unit 31 can calculate the amount of difference between the heights of the work stand before and after the change in the following manner. For example, the control unit 31 acquires the height of the work stand before the change using the parallax of the imaging units 15a and 15b. As described in step S1 illustrated in FIG. 6, the control unit 31 acquires the height of the work stand after the change, which is input by the user. The control unit 31 can calculate the amount of difference between the heights of the work stand before and after the change from the acquired heights of the work stand before and after the change.

When the control unit 31 determines that the distance between the imaging units 15a and 15b when the work stand 21 is positioned at the first height, and the work stand 21 at the second height is not present in the predetermined range, the display unit 34 may control the display device 12 to display a value of change in the height of the imaging units 15a and 15b.

For example, the control unit 31 calculates the amount of difference between the heights of the work stand before and after the change. When the height of the work stand after the change is higher than that of the work stand before the change, the display unit 34 controls the display device to display information that instructs the user to increase the height of the imaging units 15a and 15b by amount of the difference calculated by the control unit 31. When the height of the work stand after the change is lower than that of the work stand before the change, the display unit 34 controls the display device to display information that instructs the user to decrease the height of the imaging units 15a and 15b by the difference calculated by the control unit 31.

Accordingly, the user may change the height of the imaging units 15a and 15b based on a value of the amount of difference displayed on the display device 12, and it is possible to reduce labor and time required to operate the robot 1.

When the work region of the robot 1 is moved from the first height to the second height, the control unit 31 may determine whether the distance between the imaging units 15a and 15b when the work region is positioned at the first height, and the work stand at the second height is present in a predetermined range. For example, as illustrated in FIG. 5B, the control unit 31 may determine whether the work region 41 is present in the range illustrated by arrow A11.

In the description above, the robot 1 includes the robot control device 20, but the robot control device 20 may be independently provided outside the robot 1. For example, the robot control device 20 independently provided outside the robot 1 may be connected to the robot 1 via wiring, and may control the robot 1.

Hereinafter, an example (for example, example of calculating the distances x1 and x2 illustrated in FIG. 5C) of calculating a height range of the imaging units when the entirety of the work region is present in the visual field range (view frustum) of the imaging units will be described. First, a relationship between the view frustum of the imaging units and the work region will be described.

Figure 12:
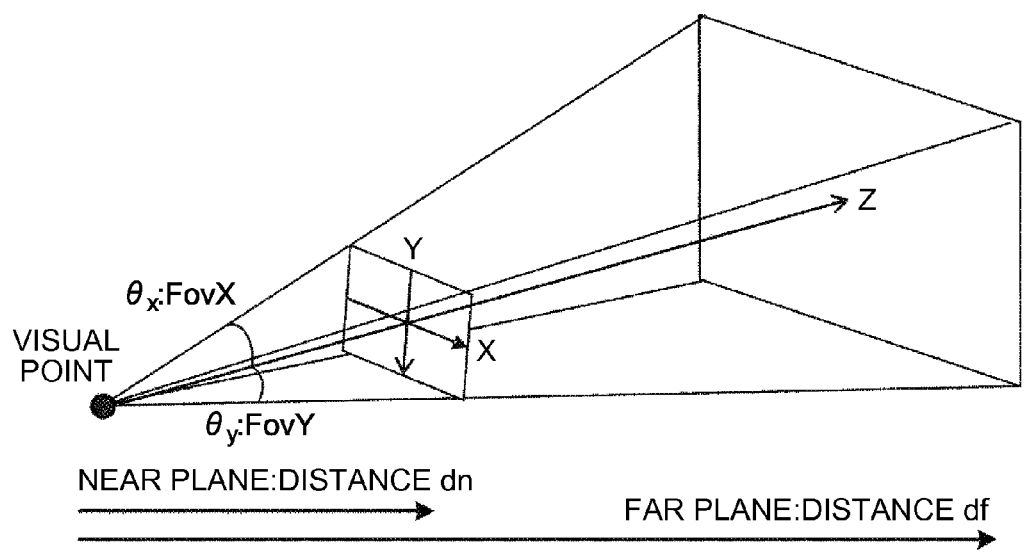
FIG. 12 is a diagram defining the view frustum of the imaging units.

FIG. 12 is a diagram defining the view frustum of the imaging units. As illustrated in FIG. 12, a right-handed coordinate system is defined in which a direction of the visual point of the imaging units is a positive Z axis direction, an X axis is positioned in a horizontal direction, and a Y axis is positioned in a vertical direction. The field of view (FOV) and the depth of field of the imaging unit are expressed by the following variables.

Field of view (viewing angle) of imaging unit: horizontal field of view $\theta_x$, vertical field of view $\theta_y$ Depth of field of imaging unit: near plane distance dn, far plane distance df In the view frustum illustrated in FIG. 12, the condition such that the imaging units encompass the entirety of the work region is that the entirety of the work region is included in a plane of the view frustum. Hereinafter, a plane equation for the view frustum is obtained.

Figure 13:
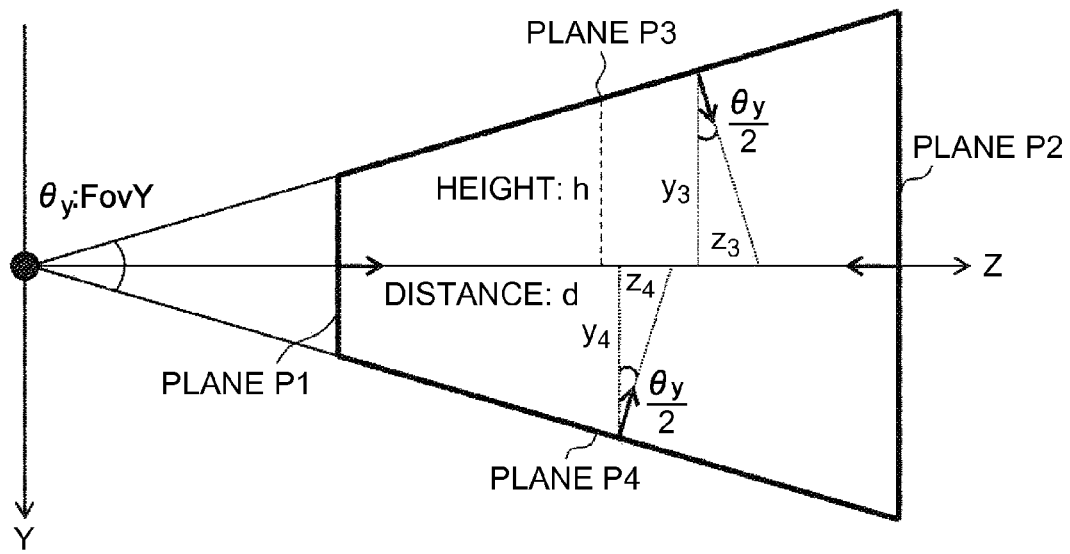
FIG. 13 is a diagram of the view frustum illustrated in FIG. 12 when seen from a Y-Z plane.
Figure 14:
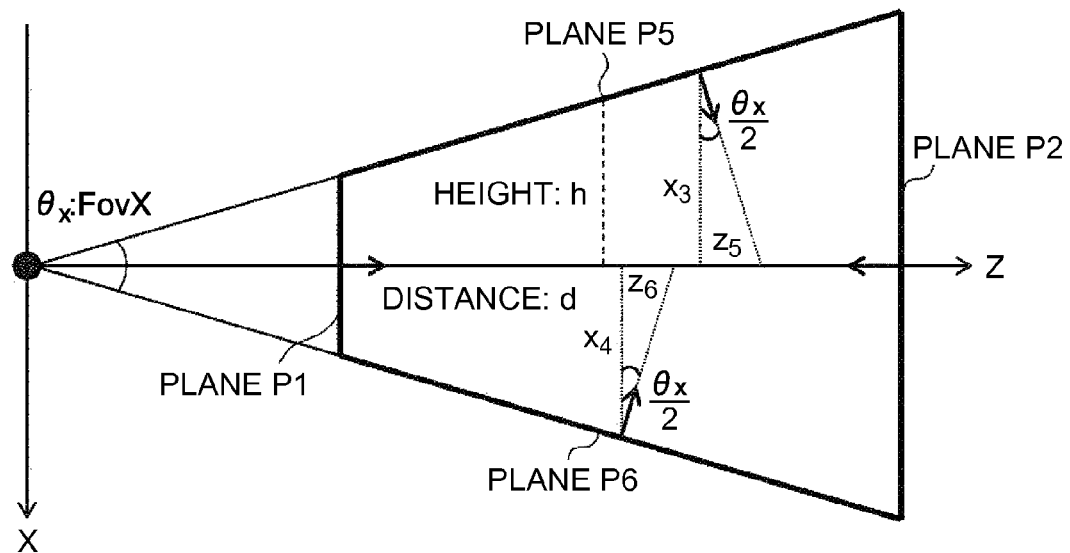
FIG. 14 is a diagram of the view frustum illustrated in FIG. 12 when seen from an X-Z plane.

FIG. 13 is a diagram of the view frustum illustrated in FIG. 12 when seen from a Y-Z plane. FIG. 14 is a diagram of the view frustum illustrated in FIG. 12 when seen from an X-Z plane. As illustrated in FIGS. 13 and 14, the view frustum is formed of six planes P1 to P6. The plane equations for the planes P1 to P6 are represented by the following Expressions (1a) to (1f), respectively.

$$z - dn = 0 \quad (1a)$$

$$z - df = 0 \quad (1b)$$

$$e_y y + z = 0 \quad (1c)$$

$$-e_y y + z = 0 \quad (1d)$$

$$e_x x + z = 0 \quad (1e)$$

$$-e_x x + z = 0 \quad (1f)$$

Here, $e_x$ and $e_y$ are represented by the following Expressions (2a) and (2b), respectively.

$$e_x = 1/(\tan \theta_x / 2) \quad (2a)$$

$$e_y = 1/(\tan \theta_y / 2) \quad (2b)$$

Here, the condition such that the entirety of the work region is present in the view frustum of the imaging units is that the entire region of the work region is present inside the view frustum formed of the planes represented by Expressions (1a) to (1f). For example, when the work region is defined as a rectangular parallelepiped shape, all eight apexes of the rectangular parallelepiped are required to be present inside the view frustum that is formed of the planes represented by the expressions (1a) and (1b). More specifically, all of apexes $Pn(X_n, Y_n, Z_n)$ (n=1, 2, to 8) of the rectangular parallelepiped are required to satisfy the following Expressions (3a) to (3f).

$$z_n - dn > 0 \quad (3a)$$

(condition for the plane P1)

$$z_n - df > 0 \quad (3b)$$

(condition for the plane P2)

$$e_y y_n + z_n > 0 \quad (3c)$$

(condition for the plane P3)

$$-e_y y_n + z_n > 0 \quad (3d)$$

(condition for the plane P4)

$$e_x x_n + z_n > 0 \quad (3e)$$

(condition for the plane P5)

$$-e_x x_n + z_n > 0 \quad (3f)$$

(condition for the plane P6)

When the work region of the rectangular parallelepiped defined by the apexes $Pn(X_n, Y_n, Z_n)$ (n=1, 2, to 8) satisfies the conditions represented by Expressions (3a) to (3f), the work region is present in the view frustum surrounded by the planes P1 to P6 illustrated in FIGS. 12 to 14.

Subsequently, description will be given to obtain the condition such that the work region is present in the view frustum when the installation position and posture of the imaging units do not coincide with the origin and coordinate axes of a reference coordinate system.

When a certain coordinate is translated $(x_0, y_0, z_0)$ in the X, Y, and Z-axis directions, respectively, the coordinate is represented by the following Expression (4).

$$\begin{pmatrix} x' \\ y' \\ z' \end{pmatrix} = \begin{pmatrix} x \\ y \\ z \end{pmatrix} + \begin{pmatrix} x_0 \\ y_0 \\ z_0 \end{pmatrix} \quad (4)$$

When a certain coordinate is rotated around the X, Y, and Z axes in order in the sequence of the Z, Y, and X axes by angles $\theta_z$, $\theta_y$, $\theta_x$, the coordinate is represented by the following Expression (5).

$$\begin{pmatrix} x' \\ y' \\ z' \end{pmatrix} = \begin{pmatrix} \cos\theta_z & -\sin\theta_z & 0 \\ \sin\theta_z & \cos\theta_z & 0 \\ 0 & 0 & 1 \end{pmatrix} \begin{pmatrix} \cos\theta_y & 0 & \sin\theta_y \\ 0 & 1 & 0 \\ -\sin\theta_y & 0 & \cos\theta_y \end{pmatrix} \begin{pmatrix} 1 & 0 & 0 \\ 0 & \cos\theta_x & -\sin\theta_x \\ 0 & \sin\theta_x & \cos\theta_x \end{pmatrix} \begin{pmatrix} x \\ y \\ z \end{pmatrix} \quad (5)$$

When cos and sin values about each axis are entered in Expression (5), and Expression (5) is arranged, rotation transformation about the Z, Y, and X axes is represented by the following Expression (6).

$$\begin{pmatrix} x' \\ y' \\ z' \end{pmatrix} = \begin{pmatrix} c_y c_z & c_z s_x s_y - c_x s_z & s_x s_z + c_x c_z s_y \\ c_y s_z & s_x s_y s_z + c_x c_z & c_x s_y s_z - c_z s_x \\ -s_y & c_y s_x & c_x c_y \end{pmatrix} \begin{pmatrix} x \\ y \\ z \end{pmatrix} \quad (6)$$

Here, $c_x = \cos\theta_x$, $s_x = \sin\theta_x$
$c_y = \cos\theta_y$, $s_y = \sin\theta_y$
$c_z = \cos\theta_z$, $s_z = \sin\theta_z$ The application of coordinate transformation represented by Expressions (4) and (6) to the plane equations (1a) to (1f) for the planes P1 to P6 gives plane equations (7a) to (7f) for the view frustum when the installation position and posture of the imaging units do not coincide with the origin and coordinate axes of the reference coordinate system.

$$(s_x s_z + c_x c_z s_y)(x - (s_x s_z + c_x c_z s_y)d_n - x_0) + (c_x s_y s_z - c_z s_x)(y - (c_x s_y s_z - c_z s_x)d_n - y_0) + (c_x c_y)(z - c_x c_y d_n - z_0) = 0 \quad (7a)$$

$$(-s_x s_z - c_x c_z s_y)(x - (s_x s_z + c_x c_z s_y)d_f - x_0) + (c_z s_x - c_x s_y s_z)(y - (c_x s_y s_z - c_z s_x)d_f - y_0) + (-c_x c_y)(z - c_x c_y d_f - z_0) = 0 \quad (7b)$$

$$(e_y(c_z s_x s_y - c_x s_z) + s_x s_z + c_x c_z s_y)(x - x_0) + (e_y(s_x s_y s_z + c_x c_z) + c_x s_y s_z - c_z s_x)(y - y_0) + (e_y c_y s_x + c_x c_y)(z - z_0) = 0 \quad (7c)$$

$$(-e_y(c_z s_x s_y - c_x s_z) + s_x s_z + c_x c_z s_y)(x - x_0) + (-e_y(s_x s_y s_z + c_x c_z) + (c_x s_y s_z - c_z s_x))(y - y_0) + (-e_y c_y s_x + c_x c_y)(z - z_0) = 0 \quad (7d)$$

$$(s_x s_z + c_x c_z s_y + c_y c_z e_x)(x - x_0) + (c_x s_y s_z + c_y e_x s_z - c_z s_x)(y - y_0) + (c_x c_y - e_x s_y)(z - z_0) = 0 \quad (7e)$$

$$(s_x s_z + c_x c_z s_y - c_y c_z e_x)(x - x_0) + (c_x s_y s_z - c_y e_x s_z - c_z s_x)(y - y_0) + (e_x s_y - c_x c_y)(z - z_0) = 0 \quad (7f)$$

Here, the condition such that the entirety of the work region is present in the view frustum of the imaging units when the installation position and posture of the imaging units do not coincide with the origin and coordinate axes of the reference coordinate system is that the entire region of the work region is present inside the view frustum which is formed of planes represented by Expressions (7a) to (7f). For example, when the work region is defined as a rectangular parallelepiped, the conditions are that all eight apexes of the rectangular parallelepiped are required to be present inside the view frustum that is formed of the planes represented by Expressions (7a) and (7b). More specifically, all of the apexes $Pn(x_n, y_n, z_n)$ (n=1, 2, to 8) of the rectangular parallelepiped are required to satisfy the following Expressions (8a) to (8f).

$$(s_xs_z+c_xc_zs_y)(x-(s_xs_z+c_xc_zs_y)d_n-x_0)+(c_xs_ys_z-c_zs_x)(y-(c_xs_ys_z-c_zs_x)d_n-y_0)+(c_xc_y)(z-c_xc_yd_n-z_0)>0 \quad (8a)$$

(Condition for the plane P1)

$$(-s_xs_z-c_xc_zs_y)(x-(s_xs_z+c_xc_zs_y)d_f-x_0)+(c_zs_x-c_xs_ys_z)(y-(c_xs_ys_z-c_zs_x)d_f+y_0)+(-c_xc_y)(z-c_xc_yd_f-z_0)>0 \quad (8b)$$

(Condition for the plane P2)

$$(e_y(s_xs_y)+c_xs_y)(x-x_0)+(e_y(c_x)-s_x)(y-y_0)+(e_yc_ys_x+c_xc_y)(z-z_0)>0 \quad (8c)$$

(Condition for the plane P3)

$$(-e_y(s_xs_y)+c_xs_y)(x-x_0)+(-e_y(c_x)+(-s_x))(y-y_0)+(-e_yc_ys_x+c_xc_y)(z-z_0)>0 \quad (8d)$$

(Condition for the plane P4)

$$(c_xs_y+c_ye_x(x-x_0)-s_x(y-y_0)+(c_xc_y-e_xs_y)(z-z_0)>0 \quad (8e)$$

(Condition for the plane P5)

$$(c_xs_y-c_ye_x(x-x_0)-s_x(y-y_0)+(e_xs_y+c_xc_y)(z-z_0)>0 \quad (8f)$$

(Condition for the plane P6)

When the work region of the rectangular parallelepiped defined by the apexes $Pn(x_n, y_n, z_n)$ (n=1, 2, to 8) satisfies the conditions represented by Expressions (8a) to (8f), the work region is present in the view frustum surrounded by the planes P1 to P6 represented by Expressions (7a) to (7f).

The planes for Expressions (8a) and (8b) are determined by the depths of field dn and df, and the installation position and posture of the imaging units. The planes for Expressions (8c) to (8f) are determined by the viewing angles $e_x$ and $e_y$ of the imaging units and the installation position and posture of the imaging units, without depending on the depths of field dn and df.

Subsequently, the installation position and posture of imaging units, the height range of which is calculated, will be described.

Figure 15A:
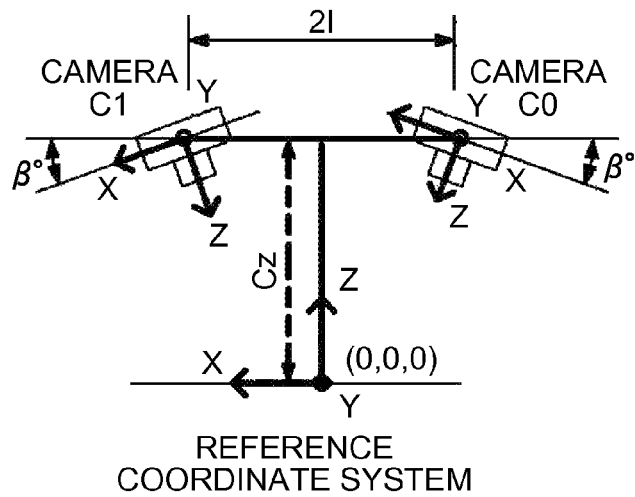
FIGS. 15A and 15B illustrate an example of the installation position and posture of the imaging units.
Figure 15B:
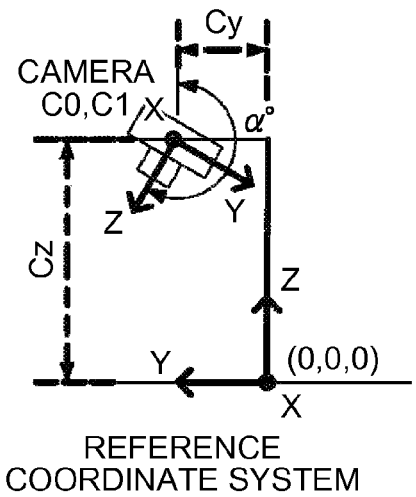

FIGS. 15A and 15B are diagrams illustrating an example of the installation position and posture of the imaging units. FIG. 15A illustrates the installation position and posture of the imaging units in the X-Z plane, and FIG. 15B illustrates the installation position and posture of the imaging units in the Y-Z plane.

In FIGS. 15A and 15B, two imaging units C0 and C1 are illustrated. The two imaging units C0 and C1 form a stereo camera.

The imaging units C0 and C1 when being installed have a base length of 2l (mm), an elevation angle of α° (180° to 270°), and a convergence angle of β° (0° to 90°). The fields of view of the imaging units C0 and C1 are $θ_x$ and $θ_y$, and the focal length is do to df (mm). The imaging unit C0 is installed at a coordinate (−l, Cy, Cz) in the reference coordinate system, and the imaging unit C1 is installed at a coordinate (l, Cy, Cz) in the reference coordinate system.

At this time, the imaging unit C0 is installed at a position in which the imaging unit C0 is respectively rotated about the Z, Y, and X axes in the sequence in the reference coordinate system by (α°, −β°, 0), and then is respectively translated in the axis directions by (−l, Cy, Cz) (mm). The imaging unit C1 is installed at a position in which the imaging unit C1 is respectively rotated about the Z, Y, and X axes in the sequence in the reference coordinate system by (α°, β°, 0), and then is respectively translated in the axis directions by (l, Cy, Cz) (mm).

Subsequently, the installation of a work region will be described.

Figure 16A:
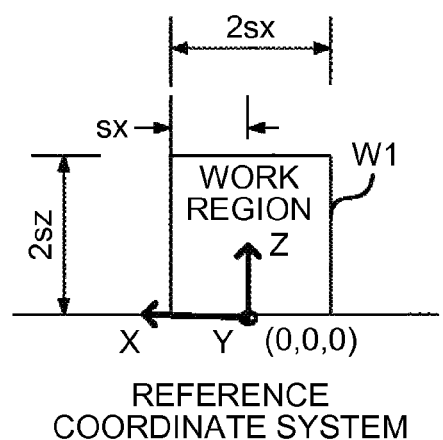
FIGS. 16A and 16B illustrate an example of the installation of a work region.
Figure 16B:
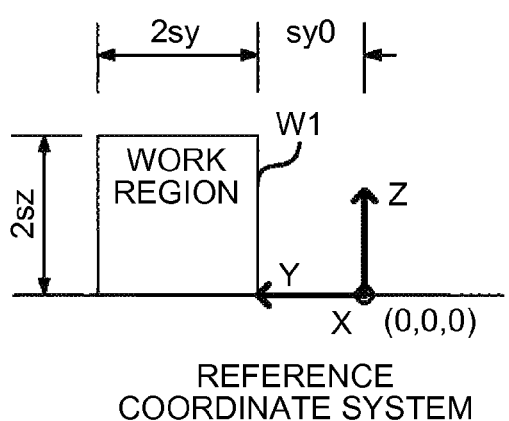

FIGS. 16A and 16B are diagrams illustrating an example of the installation of the work region. FIG. 16A illustrates an example of the installation of the work region in the X-Z plane, and FIG. 16B illustrates an example of the installation of the work region in the Y-Z plane.

In FIGS. 16A and 16B, a work region W1 is illustrated. The work region W1 is a cubic shape, and as illustrated in FIGS. 16A and 16B, the lengths (mm) of the sides are 2sx, 2sy, and 2sz, respectively. The center of the work region W1 is positioned at a coordinate (0, sy0, sz). At this time, the coordinates for eight apexes of the work region W1 are represented as follows.

Apex 1: (−sx, sy0, 0)
Apex 2: (−sx, sy0, 2sz)
Apex 3: (−sx, sy0+2sy, 0)
Apex 4: (−sx, sy0+2sy, 2sz)
Apex 5: (sx, sy0, 0)
Apex 6: (sx, sy0, 2sz)
Apex 7: (sx, sy0+2sy, 0)
Apex 8: (sx, sy0+2sy, 2sz)

Hereinafter, a specific height range of the imaging units is calculated.

FIG. 17 is a table illustrating specific parameter values for calculating the height of the imaging units. The camera visual fields "$θ_x$, and $θ_y$" of the imaging units C0 and C1 illustrated in FIGS. 15A and 15B have values for the "camera visual fields" illustrated in FIG. 17. Accordingly, "tan $θ_x/2$" and "tan $θ_y/2$" have values for the variables "tan $θ_x/2$" and "tan $θ_y/2$" illustrated in FIG. 17, respectively, and "$e_x$" and "$e_y$" represented in Expressions (2a) and (2b) have values for the variables "$e_x$" and "$e_y$" illustrated in FIG. 17, respectively.

The rotation "α" and "β" of the imaging units C0 and C1 illustrated in FIGS. 15A and 15B have values for the "rotation of camera" illustrated in FIG. 17. Accordingly, "$s_x$", "$s_y$", "$s_z$", "$c_x$", "$c_y$", and "$c_z$" represented in the provisionary clause of Expression (6), and Expressions (8a) to (8f) have values for the variables "$s_x$", "$s_y$", "$s_z$", "$c_x$", "$c_y$", and "$c_z$" illustrated in FIG. 17.

The translation "$x_0$, $y_0$, and $z_0$" of the imaging units C0 and C1 illustrated in FIGS. 15A and 15B have values for the "translation of camera" illustrated in FIG. 17. Since the height of the imaging units C0 and C1, in which the entirety of the work region is present in the view frustum of the imaging units C0 and C1, is obtained, "Cz" is an unknown number.

The depths of field "dn and df" of the imaging units C0 and C1 illustrated in FIGS. 15A and 15B have values for the "depth of field" illustrated in FIG. 17.

"2sx, 2sy, 2sz, and sy0" of the work region W1 illustrated in FIGS. 16A and 16B are 300, 300, 300, and 200. The coordinates for the apexes of the work region W1 are as follows.

Apex 1: (−150, 200, 0)
Apex 2: (−150, 200, 300)
Apex 3: (−150, 500, 0)
Apex 4: (−150, 500, 300)
Apex 5: (150, 200, 0)
Apex 6: (150, 200, 300)
Apex 7: (150, 500, 0)
Apex 8: (150, 500, 300)

The condition such that the apexes of the work region W1 are present in the plane P1 of the view frustum of the imaging unit C0 is obtained. That is, the parameters illustrated in FIG. 17 are entered in Expression (8a) (since the conditions for the view frustum of the imaging unit C0 are obtained, "−20°", "−150", and "−0.3420" are entered in β, $C_x$, and $S_β$, respectively), and the coordinates for the apexes of the work region W1 are entered in x, y, and z in Expression (8a), respectively. As a result, the following results can be obtained.
Condition for the apex 1 being present in the plane P1 of the view frustum: 307.2017<Cz,
Condition for the apex 2 being present in the plane P1 of the view frustum: 607.2017<Cz,
Condition for the apex 3 being present in the plane P1 of the view frustum: 122.8807<Cz,
Condition for the apex 4 being present in the plane P1 of the view frustum: 422.8807<Cz,
Condition for the apex 5 being present in the plane P1 of the view frustum: 198.0106<Cz,
Condition for the apex 6 being present in the plane P1 of the view frustum: 498.0106<Cz,
Condition for the apex 7 being present in the plane P1 of the view frustum: 13.6896<Cz,
Condition for the apex 8 being present in the plane P1 of the view frustum: 313.6896<Cz The strictest condition of these conditions is that the apex 2 is present in the plane P1 of the view frustum. That is, at least the condition "607.2017<Cz" is required to be satisfied in order for the apexes of the work region W1 to be present in the plane P1 of the view frustum.

Hereinafter, similarly, the conditions such that the apexes of the work region W1 are present in the planes P2 to P6 of the view frustum are obtained. That is, the parameters illustrated in FIG. 17 are entered in conditional Expressions (8b) to (8f) for the planes P2 to P6, and the coordinates for the apexes of the work region W1 are entered in x, y, and z in Expressions (8b) to (8f). As a result, the conditions such that the apexes are present in the planes P2 to P6 of the view frustum are obtained. The strictest condition for each plane is extracted. The strictest conditions for the planes P2 to P6 together with the condition for the plane P1 are as follows.
Condition for the plane P1: 607.2017<Cz,
Condition for the plane P2: Cz<873.8542,
Condition for the plane P3: 125.9030<Cz,
Condition for the plane P4: 297.3330<Cz,
Condition for the plane P5: 220.3311<Cz,
Condition for the plane P6: 314.6146<Cz From the above-mentioned six conditions, the height range of the imaging unit C0, in which the entirety of the work region W1 is present in the view frustum of the imaging unit C0, is as follows.

$$607.2017 < Cz < 873.8542$$

In the imaging unit C1, similarly to the imaging unit C0, the height range of the imaging unit C1 in which the entirety of the work region W1 is present in the view frustum of the imaging unit C1, is obtained. The parameters illustrated in FIG. 17 are entered in Expressions (8a) to (8f), and "+20°", "+150", and "+0.3420" are entered in "β", "1", and "$S_\beta$", respectively.

The view frustum of the imaging unit C1 is axisymmetric with respect to the view frustum of the imaging unit C0 in the Z direction (height direction of the imaging units C0 and C1). Accordingly, the imaging unit C1 has the same height range as that of the imaging unit C0. As such, the height range of the imaging units C0 and C1, in which the entirety of the work region W1 is present in the view frustum of the imaging units C0 and C1, is "607.2017<Cz<873.8542".

"Cz" indicates the distance between the imaging units C0 and C1, and the work stand from FIGS. 15A and 15B, and FIGS. 16A and 16B. For example, "607.2017" corresponds to the distance x1 in FIG. 5C, and "873.8542" corresponds to the distance x2 in FIG. 5C.

As illustrated in FIG. 6 and the like, the storage unit 32 pre-stores the distances x1 and x2. For example, the distances x1 and x2 are pre-calculated using a calculator such as a personal computer via the above-mentioned calculation method, and stored in the storage unit 32. Alternatively, the control unit 31 of the robot 1 may calculate the distances x1 and x2, and the storage unit 32 may store the distances x1 and x2. At this time, for example, the user inputs the parameters illustrated in FIG. 17 and the apexes of the work region via the touch panel of the display device 12. Alternatively, the robot 1 may be provided with a sensor for detecting the rotation and translation of the imaging units 15a and 15b, and the control unit 31 may acquire parameters relative to the rotation and translation from that sensor.

In the description of the examples of calculating the height range of the imaging units C0 and C1, the work region has a rectangular parallelepiped shape or a cubic shape; however, the work region may have another three dimensional shape such as a polyhedron shape. The condition such that the apexes of the three dimensional shape are present in the view frustum are preferably obtained.

The embodiment of the invention is described, but the technological scope of the invention is not limited to that in the embodiment. It is apparent to persons skilled in the art that modifications or improvements can be made to the embodiment in various forms. It is apparent from the appended claims that the technological scope of the invention can also include embodiments with the modifications or the improvements. The invention may provide a robot system in which a robot, a robot control device, and the like are individually installed, may provide a robot that includes a robot control device and the like, or may provide a robot control device. The invention can also provide a method of controlling a robot and the like, a program that causes a control unit to control a robot and the like, or a storage medium that stores the program.

The invention can be provided in various forms such as a robot, a robot system, a method of instructing the elevation of a robot, or a program for instructing the elevation of a robot.

The entire disclosure of Japanese Patent Application No. 2014-004894, filed Jan. 15, 2014 is expressly incorporated by reference herein.

What is claimed is:
1. A robot comprising:
an imaging device; and
a robot control device that is configured to control the robot,
wherein when the robot moves from a first work stand to a second work stand which have different heights, and when a difference between a height of the imaging device before the robot moves and the height of the second work stand is out of a predetermined range, the robot controller instructs a display to display an instruction indicative of a change in the height of the imaging device.
2. The robot according to claim 1,
wherein a change value of the change in the height of the imaging device is displayed in the display.
3. The robot according to claim 1,
wherein a robot performing work region in which the robot performs work on the first work stand is in a visual field range of the imaging device.
4. The robot according to claim 1,
wherein the imaging device is configured with two cameras which corresponds to a stereo camera, and wherein the predetermined range is determined based a distance between two cameras, a viewing angle of each of the two cameras, an object depth of the two cameras, a rotation of each of the two cameras, a translational position of each of the two cameras, and a robot performing work region in which the robot performs work.

5. The robot according to claim 1,
wherein the predetermined range is determined based on an area ratio between work regions which are occupied by viewing angles of the two cameras, respectively.

6. A robot comprising:
an imaging device; and
a robot control device that is configured to control the robot,
wherein when the robot moves from a first work region to a second work region which have different heights, and when a difference between a height of the imaging device before the robot moves and the height of the second work region is out of a predetermined range, the robot controller instructs a display to display an instruction indicative of a change in the height of the imaging device.

7. A robot control device that is configured to control a robot,
wherein when the robot moves from a first work stand to a second work stand which have different heights, and when a difference between a height of an imaging device before the robot moves and the height of the second work stand is out of a predetermined range, the robot control device instructs a display to display an instruction indicative of a change in the height of the imaging device.

* * * * *